(12) United States Patent
Plotnikov et al.

(10) Patent No.: US 12,299,501 B2
(45) Date of Patent: May 13, 2025

(54) TECHNOLOGIES FOR MANAGING DATA WAIT BARRIER OPERATIONS

(71) Applicant: Intel Corporation, Santa Clara, CA (US)

(72) Inventors: Mikhail Plotnikov, Nizhny Novgorod (RU); Mikhail Shiryaev, Nizhegorodskaya oblast (RU)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 17/434,720

(22) PCT Filed: Mar. 29, 2019

(86) PCT No.: PCT/IB2019/000362
§ 371 (c)(1),
(2) Date: Aug. 27, 2021

(87) PCT Pub. No.: WO2020/201789
PCT Pub. Date: Oct. 8, 2020

(65) Prior Publication Data
US 2022/0129329 A1    Apr. 28, 2022

(51) Int. Cl.
*G06F 9/54* (2006.01)
*G06F 9/52* (2006.01)

(52) U.S. Cl.
CPC .............. *G06F 9/522* (2013.01); *G06F 9/546* (2013.01)

(58) Field of Classification Search
CPC ...... G06F 1/329; G06F 9/4843; G06F 9/4881; G06F 9/4887; G06F 9/505; G06F 9/5083; G06F 9/5088; H04L 67/101
See application file for complete search history.

(56) References Cited

U.S. PATENT DOCUMENTS

| 8,108,467 | B2  |         | 1/2012 | Archer et al. |
| 8,387,064 | B2* | 2/2013  | Archer | ............... G06F 9/505 709/224 |
| 9,262,235 | B2* | 2/2016  | Tillier | ............... G06F 9/526 |

(Continued)

FOREIGN PATENT DOCUMENTS

EP        1662725 B1    2/2011

OTHER PUBLICATIONS

International Search Report and Written Opinion for PCT Patent Application No. PCT/IB2019/000362, Mailed Nov. 29, 2019, 14 pages.

(Continued)

*Primary Examiner* — Andy Ho
(74) *Attorney, Agent, or Firm* — Compass IP Law PC

(57) ABSTRACT

Technologies for managing data wait barrier operations include starting a receive operation associated with a receive buffer of a compute node that includes a plurality of chunks of data received from a sender compute node. Each of the plurality of chunks of data may be received in an out-of-order sequence relative to an order in which they were transmitted from the sender compute node. The compute node may determine whether a chunk of data in the receive buffer satisfies a condition to be met prior to performing one or more data wait barrier operations to be performed by the compute node to process the chunk of data and, if so, perform a partial computation over the chunk of data.

24 Claims, 7 Drawing Sheets

(56) References Cited

U.S. PATENT DOCUMENTS

| | | | |
|---|---|---|---|
| 10,334,028 B2 * | 6/2019 | Imamura | G06F 9/5083 |
| 2020/0145725 A1 * | 5/2020 | Eberle | H04N 21/2387 |

OTHER PUBLICATIONS

Walker, David W., "The design of a standard message passing interface for distributed memory concurrent computers", Parallel Computing, vol. 20. No. 4, pp. 657-673, Apr. 1994.

* cited by examiner

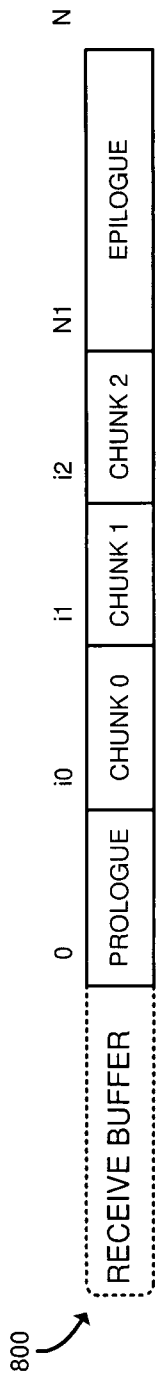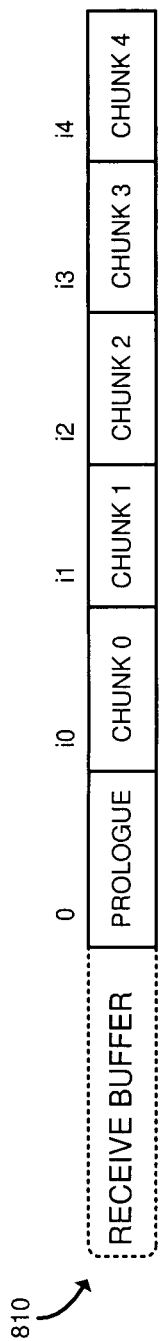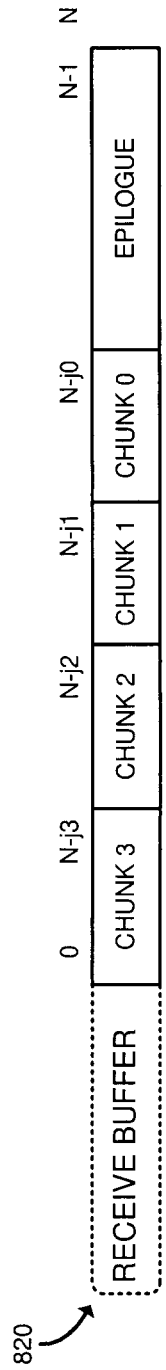

TECHNOLOGIES FOR MANAGING DATA WAIT BARRIER OPERATIONS

CLAIM OF PRIORITY

This application claims the benefit of PCT Application No. PCT/IB2019/0000362, filed Mar. 29, 2019, entitled TECHNOLOGIES FOR MANAGING DATA WAIT BARRIER OPERATIONS, which is incorporated in its entirety herewith.

BACKGROUND

The Message Passing Interface (MPI) is a standardized system for passing messages between compute nodes or processes in parallel computing systems. MPI defines point-to-point message ordering between two processes based on the matching criteria of MPI messages: a user-supplied tag, sender process (i.e., the source rank), and a communicator identifier (e.g., context ID). Message passing via a network occurs by chunks of data and each network layer may have its own data granularity. For example, the lowest hardware layer operates with the smallest packets, while the MPI fabrics layer may accumulate packets to larger chunks in a receive buffer. On the highest user-level, MPI operates with arrays of arbitrary size without knowing hardware specifics. Therefore, on an impermeable synchronization barrier, preceding computation over received data, execution of the computation is stalled until the whole array is received, although some continuous data regions in the receive buffer may be available beforehand.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 8A-8C are a simplified block diagram of at least one embodiment of chunks of data in a receive buffer for processing that may be established by the compute node of FIGS. 1-3.

DETAILED DESCRIPTION OF THE DRAWINGS

Figure 1:
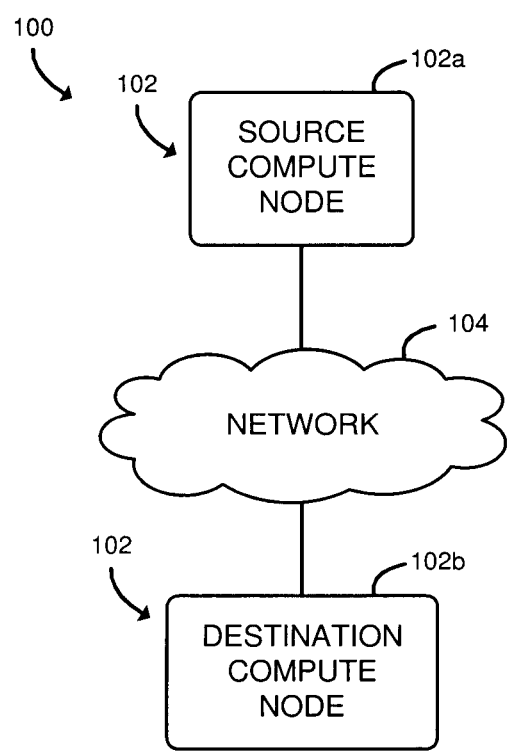
FIG. 1 is a simplified diagram of at least one embodiment of a compute node for managing data wait barrier operations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for managing data wait barrier operations, such as Message Passing Interface (MPI) wait operations, includes a source compute node 102a communicatively coupled to a destination compute node 102b via a network 104. While illustratively shown as having two compute nodes 102, the system 100 may include multiple compute nodes 102 in other embodiments. It should be appreciated that the source compute node 102a and the destination compute node 102b have been illustratively designated and described herein, as being one of a "source"

of network traffic (i.e., the source compute node 102*a*) and a "destination" of the network traffic (i.e., the destination compute node 102*b*) for the purposes of providing clarity to the description. It should be further appreciated that, in some embodiments, the source compute node 102*a* and the destination compute node 102*b* may reside in the same data center or high-performance computing (HPC) environment. In other words, the source compute node 102*a* and the destination compute node 102*b* may reside in the same network 104 connected via one or more wired and/or wireless interconnects.

In an illustrative example, the source compute node 102*a* generates a network packet that includes data to be transmitted to and processed by the destination compute node 102*b*. Typically, upon receipt of the network packet, the destination compute node 102*b* performs one or more processing operations on at least a portion of the data of the received network packet. Such processing operations may include network services, including, but not limited to, firewall services, network address translation (NAT) services, domain name system (DNS) services, load-balancing services, deep packet inspection (DPI) services, transmission control protocol (TCP) optimization services, cache management services, Internet Protocol (IP) address management services, etc.

Depending on the processing operation(s) to be performed, various communications are required to be passed between various components of the destination compute node 102*b* to perform the operations. It should be appreciated that message passing via a network (e.g., the network 104) occurs by chunks of data and each network layer may have its own data granularity. In other words, one or more compute nodes 102 may transmit data in chunks to the destination compute node 102*b* for processing. Oftentimes, network packets with data (i.e., data chunks) may arrive, via the network 104, at the destination compute node 102*b* in an arbitrary order and placed into the receive buffer for processing.

For example, packets retransmission due to lost packets, packet corruption, dropped packets (e.g., due to a sending rate being too fast, a processing rate being too slow, etc., on the receiver side), etc., different parts of a message can be received in an arbitrary order. In another example, when the network layer uses multiple parallel paths to deliver packets, in such applicable embodiments in which the network topology supports such delivery, different parts of a message can be received in arbitrary order. Further, a network's chunks can have different sizes, as defined by the applicable communication protocols in use, and the computation layer may not be aware of all network specifics, but the network layer typically does and can leverage this to help organize effective computation flow on the compute nodes 102.

As a result, on an impermeable synchronization barrier, preceding computation over received data, execution of the computation can be stalled until the whole array is received, although some continuous data regions in the receive buffer may be available beforehand. As will be described in further detail below, the destination compute node 102*b* is configured to take advantage of finer granularity of message passing on lower network layers and do partial computation over chunks of data as soon as they arrive at a receive buffer. In other words, under present conditions in which a virtual blocking scheme for waiting for the arrival of additional chunks of data before proceeding with processing any presently received data chunks forms an impermeable barrier (i.e., processing cannot be performed until the chunks in an entire receive buffer are available), the destination compute node 102*b* is configured to turn the impermeable barrier into a semipermeable barrier for processing data chunks of smaller sizes (i.e. smaller data chunks are able to pass through the semipermeable barrier as soon as they arrive to the receive buffer).

Accordingly, a computational component of the destination compute node 102*b* (see, e.g., a processor 200 of FIG. 2) can be notified that partial computation over the smaller data chunks can be performed immediately upon receipt at the receive buffer, or as soon as computational resources become available. It should be appreciated that, after performing partial computation, execution can return to waiting for other data chunks. As such, actual blocking can be delayed until the whole array has passed the semipermeable barrier chunk by chunk and the whole computation is performed.

It should be understood that one sender process communicating with one receiver process is commonly referred to as a point-to-point communication, while a broadcast message issued by a sender process to more than one receiver process and/or receiving messages by a receiver process from more than one sender process is commonly referred to as a collective communication. In an illustrative embodiment in which an MPI receive operation is followed by computations over the received data, consider a point-to-point communication, when one MPI rank (i.e., the sender) sends a message of "N" elements from array A (e.g., wherein "N" is a positive integer), another MPI rank (i.e., the receiver) receives data to array B and performs computations over elements of the array. A blocking receive operation implies an implicit barrier, in which blocking while waiting for completion of the receive operation occurs. Alternatively, instead of blocking the receive operation, communication can be done via non-blocking, followed by an explicit wait barrier before a computational loop.

Data in the receive buffer B will be partially available as receive operation is progressing, but computation will only be able to start when the whole array is received. In other words, the whole message receive latency will be paid. It should be appreciated that waiting in implicit impermeable barriers is also present in MPI collective operations. Separate consideration requires collective reduction operations (e.g., MPI_Reduce, MPI_Allreduce, etc.) which have embedded computations (e.g., reduction) and are commonly used in machine learning algorithms. Accordingly, such reduction operations are only started when the entire message aimed for reduction has been received from one or several MPI ranks, depending on internal algorithm chosen by MPI to perform collective reduction. For example, MPI_Allreduce on medium and large size data chunks with a predefined and custom reduction operation is frequently used in Machine Learning algorithms. It should be appreciated that the operations described herein can be applied to other communication runtimes, such as MPI, such that communication specifics (ordering, sizing) in the applicable technology in which the operations described herein are employed can be leveraged to construct effective computation flow.

The compute nodes 102 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart NIC/HIFI, a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

Figure 2:
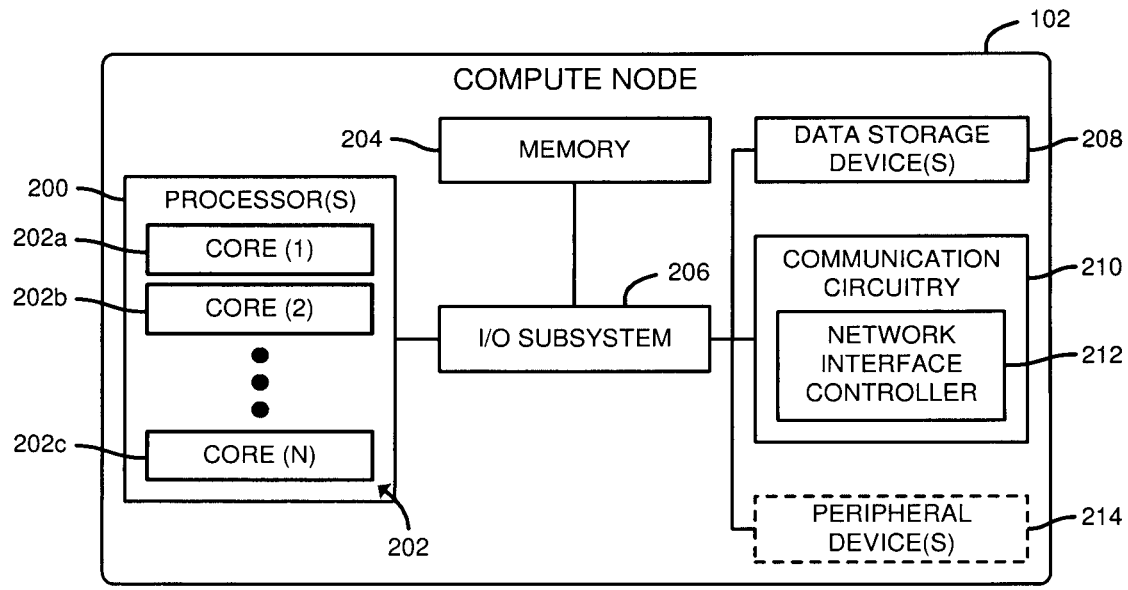
FIG. 2 is a simplified block diagram of at least one embodiment of a compute node of the system of FIG. 1.

As shown in FIG. 2, an illustrative compute node 102 (e.g., an illustrative one of the source compute node 102a, the destination compute node 102b, etc.) is shown that includes one or more processors 200, memory 204, an I/O subsystem 206, one or more data storage devices 208, communication circuitry 210, and, in some embodiments, one or more peripheral devices 214. It should be appreciated that the compute node 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The processor(s) 200 may be embodied as any type of device or collection of devices capable of performing the various compute functions as described herein. In some embodiments, the processor(s) 200 may be embodied as one or more multi-core processors, digital signal processors (DSPs), microcontrollers, or other processor(s) or processing/controlling circuit(s). In some embodiments, the processor(s) 200 may be embodied as, include, or otherwise be coupled to an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein.

The illustrative processor(s) 200 includes multiple processor cores 202 (e.g., two processor cores, four processor cores, eight processor cores, sixteen processor cores, etc.). The illustrative processor cores include a first processor core 202 designated as core (1) 202a, a second processor core 202 designated as core (2) 202b, and a third processor core 202 designated as core (N) 202c (e.g., wherein the core (N) 202c is the "Nth" processor core 202 and "N" is a positive integer). Each of processor cores 202 may be embodied as an independent logical execution unit capable of executing programmed instructions. It should be appreciated that, in some embodiments, the compute node 102 (e.g., in supercomputer embodiments) may include thousands of processor cores 202. Each of the processor(s) 200 may be connected to a physical connector, or socket, on a motherboard (not shown) of the compute node 102 that is configured to accept a single physical processor package (i.e., a multi-core physical integrated circuit). It should be appreciated that, while not illustratively shown, each of the processor cores 202 may be communicatively coupled to at least a portion of a cache memory and functional units usable to independently execute programs, operations, threads, etc.

The memory 204 may be embodied as any type of volatile or non-volatile memory or data storage capable of performing the functions described herein. In operation, the memory 204 may store various data and software used during operation of the compute node 102, such as operating systems, applications, programs, libraries, and drivers. It should be appreciated that the memory 204 may be referred to as main memory, or a primary memory. It should be understood that volatile memory may be a storage medium that requires power to maintain the state of data stored by the medium. Non-limiting examples of volatile memory may include various types of random access memory (RAM), such as dynamic random access memory (DRAM) or static random access memory (SRAM).

One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory 204 is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 204 may be integrated into the processor 200. In operation, the memory 204 may store various software and data used during operation such as workload data, hardware queue manager data, migration condition data, applications, programs, libraries, and drivers.

Each of the processor(s) 200 and the memory 204 are communicatively coupled to other components of the compute node 102 via the I/O subsystem 206, which may be embodied as circuitry and/or components to facilitate input/output operations with the processor(s) 200, the memory 204, and other components of the compute node 102. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a SoC and be incorporated, along with one or more of the processors 200, the memory 204, and other components of the compute node 102, on a single integrated circuit chip.

The one or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device 208. Each data storage device 208 may also include an operating system partition that stores data files and executables for an operating system.

The communication circuitry 210 may be embodied as any communication circuit, device, or collection thereof, capable of enabling communications between the compute node 102 and other computing devices, as well as any network communication enabling devices, such as an access point, switch, router, etc., to allow communication over the network 104. Accordingly, the communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. It should be appreciated that, in some embodiments, the communication circuitry 210 may include specialized circuitry, hardware, or combination thereof to perform pipeline logic (e.g., hardware algorithms) for performing the functions described herein, including processing network packets (e.g., parse received network packets, determine target compute nodes for each received network packets, forward the network packets to a particular buffer queue of a respective host buffer of the compute node 102, etc.), performing computational functions, storing data, etc.

In some embodiments, performance of one or more of the functions of communication circuitry 210 as described herein may be performed by specialized circuitry, hardware, or combination thereof of the communication circuitry 210, which may be embodied as a SoC or otherwise form a portion of a SoC of the compute node 102 (e.g., incorporated on a single integrated circuit chip along with one of the processor(s) 200, the memory 204, and/or other components of the compute node 102). Alternatively, in some embodiments, the specialized circuitry, hardware, or combination thereof may be embodied as one or more discrete processing units of the compute node 102, each of which may be capable of performing one or more of the functions described herein.

The illustrative communication circuitry 210 includes the NIC 212, which may be embodied as one or more add-in-boards, daughtercards, network interface cards, controller chips, chipsets, or other devices that may be used by the compute node 102 to connect with another compute device (e.g., another compute node 102). In some embodiments, the NIC 212 may be embodied as part of a SoC that includes one or more processors, or included on a multichip package that also contains one or more processors. While not illustratively shown, it should be understood that the NIC 212 includes one or more physical ports for facilitating the ingress and egress of network traffic to/from the NIC 212. Additionally, in some embodiments, the NIC 212 may include one or more offloads/accelerators, such as a direct memory access (DMA) engine. Additionally or alternatively, in some embodiments, the NIC 212 may include a local processor (not shown) and/or a local memory (not shown) that are both local to the NIC 212. In such embodiments, the local processor of the NIC 212 may be capable of performing one or more of the functions of a processor 200 described herein. Additionally or alternatively, in such embodiments, the local memory of the NIC 212 may be integrated into one or more components of the compute node 102 at the board level, socket level, chip level, and/or other levels.

The one or more peripheral devices 214 may include any type of device that is usable to input information into the compute node 102 and/or receive information from the compute node 102. The peripheral devices 214 may be embodied as any auxiliary device usable to input information into the compute node 102, such as a keyboard, a mouse, a microphone, a barcode reader, an image scanner, etc., or output information from the compute node 102, such as a display, a speaker, graphics circuitry, a printer, a projector, etc. It should be appreciated that, in some embodiments, one or more of the peripheral devices 214 may function as both an input device and an output device (e.g., a touchscreen display, a digitizer on top of a display screen, etc.). It should be further appreciated that the types of peripheral devices 214 connected to the compute node 102 may depend on, for example, the type and/or intended use of the compute node 102. Additionally or alternatively, in some embodiments, the peripheral devices 214 may include one or more ports, such as a USB port, for example, for connecting external peripheral devices to the compute node 102. In some embodiments, the one or more peripheral devices 214 may include one or more sensors (e.g., a temperature sensor, a fan sensor, etc.).

Referring back to FIG. 1, the network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the source compute node 102a and the destination compute node 102b, which are not shown to preserve clarity of the description.

Figure 3:
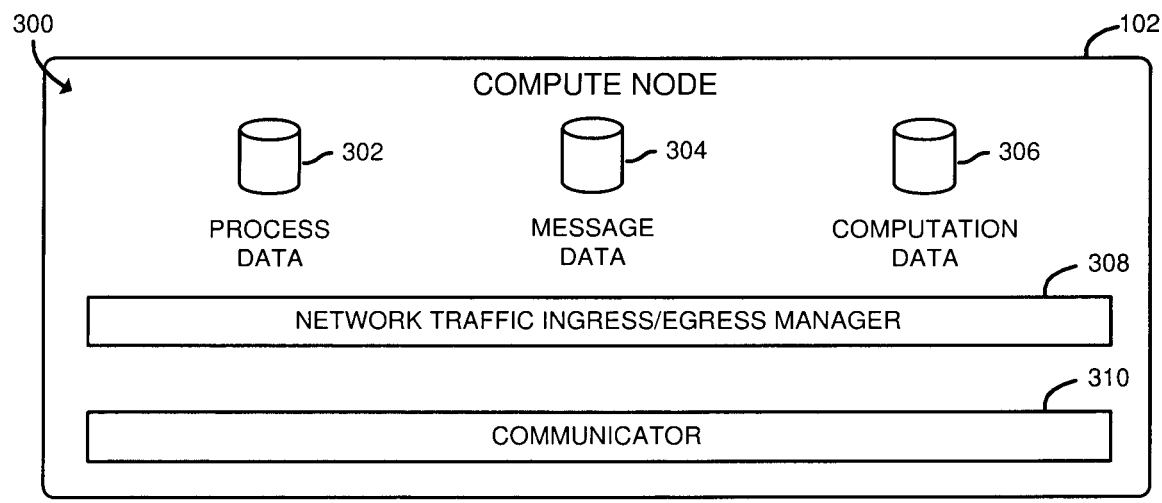
FIG. 3 is a simplified block diagram of at least one embodiment of an environment that may be established by the compute node of FIGS. 1 and 2.

Referring now to FIG. 3, the compute node 102 may establish an environment 300 during operation. The illustrative environment 300 includes a network traffic ingress/egress manager 308 and a communicator 310. The various components of the environment 300 may be embodied as hardware, firmware, software, or a combination thereof. As such, in some embodiments, one or more of the components of the environment 300 may be embodied as circuitry or a collection of electrical devices (e.g., network traffic ingress/egress management circuitry 308, communicator circuitry 310, etc.). It should be appreciated that, in such embodiments, one or more of the network traffic ingress/egress management circuitry 308 and the communicator circuitry 310 may form a portion of one or more of the processor(s) 200, the memory 204, the communication circuitry 210, the I/O subsystem 206 and/or other components of the compute node 102.

It should be further appreciated that, in other embodiments, one or more functions described herein as being performed by a particular component of the compute node 102 may be performed, at least in part, by one or more other components of the compute node 102, such as the one or more processors 200, the I/O subsystem 206, the communication circuitry 210, an ASIC, a programmable circuit such as an FPGA, and/or other components of the compute node 102. It should be further appreciated that associated instructions may be stored in the memory 204, the data storage device(s) 208, and/or other data storage location, which may be executed by one of the processors 200 and/or other computational processor of the compute node 102.

Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the NIC 212, the processor(s) 200, or other components of the compute node 102. It should be appreciated that the compute node 102 may include other components, sub-components, modules, sub-modules, logic, sub-logic, and/or devices commonly found in a computing device, which are not illustrated in FIG. 2 for clarity of the description.

In the illustrative embodiment, the environment 300 includes process data 302, message data 304, and computation data 306, each of which may be accessed by the various components and/or sub-components of the compute node 102. Additionally, it should be appreciated that in some embodiments the data stored in, or otherwise represented by, each of the process data 302, the message data 304, and the computation data 306 may not be mutually exclusive relative to each other. For example, in some implementations, data stored in the process data 302 may also be stored as a portion of the message data 304 and/or the computation data 306. As such, although the various data utilized by the compute node 102 is described herein as particular discrete data, such data may be combined, aggregated, and/or otherwise form portions of a single or multiple data sets, including duplicative copies, in other embodiments.

The network traffic ingress/egress manager 308, which may be embodied as hardware, firmware, software, virtualized hardware, emulated architecture, and/or a combination thereof as discussed above, is configured to receive inbound and route/transmit outbound network traffic. To do so, the network traffic ingress/egress manager 308 is configured to facilitate inbound/outbound network communications (e.g., network traffic, network packets, network flows, etc.) to and from the compute node 102. For example, the network traffic ingress/egress manager 308 is configured to manage (e.g., create, modify, delete, etc.) connections to physical and virtual network ports (i.e., virtual network interfaces) of the compute node 102 (e.g., via the communication circuitry 210), as well as the ingress/egress buffers/queues associated therewith.

The communicator 310, which may be embodied as hardware, firmware, software, virtualized hardware, emulated architecture, and/or a combination thereof as discussed above, is configured to manage a group of processes that can communicate with one another. To do so, each process is assigned a rank by the communicator 310. Accordingly, the processes can communicate by sending, via the MPI, send/receive operations with their assigned rank and an associated tag, if necessary. It should be appreciated that, as described previously, data chunks may be received by the network traffic ingress/egress manager 308 having different sizes and arrive to a receive buffer managed by the network traffic ingress/egress manager 308 in arbitrary order.

As described previously, idle time in a spin loop on a computational device of the compute node 102 (e.g., a processor 200 of the compute node 102 of FIG. 2) while waiting for data arrival from the NIC (e.g., the NIC 212 of FIG. 2) of the compute node 102 to a receive buffer (see, e.g., the receive buffer 502 of FIG. 5) of the compute node 102 can be used to perform computations over partially available continuous chunks of data in the receive buffer (i.e., partial computations) as receive operation is progressing. To do so, in some embodiments, the communicator 310 is configured to define the partial computation in a user callback application programming interface (API), as may be defined by arbitrary offset in the receive buffer and data chunk size. Accordingly, actual blocking is delayed until the whole receive buffer is available and all computations are done, while latency of receiving original message, standing on a critical path, is partly or fully hidden. Sizes of data chunks passing to the partial computation stage can be controlled by lower network layers based on various network hardware and/or protocol specifics. Depending on the embodiments, a hint on the size(s) optimized for computations may be programmatically defined (e.g., by a network administrator, a remotely coupled network controller, etc.).

The notifying mechanism for the data chunk readiness described above should provide an offset of the ready data chunk and a size of the data chunk to the computational device. As such, the parameters can be used to do partial computation over the respective data chunk. In some embodiments, the notifying mechanism combined with partial computation may be performed leveraging a callback upon completion of the operation. Accordingly, the resulting output buffer is made a part of the interface and passed as an input parameter to the callback. The callback function can take any data chunk of arbitrary size and perform the necessary computation over that data chunk, referred to herein as "partial computation". Depending on the embodiment, the callback may be performed by passing a pointer to the receive buffer, a number of elements to receive, a reference to the partial computation to be performed, and a pointer to an output array of the computation. In alternative embodiments, the output buffer can be declared as a global pointer and not be passed to the callback.

It should be appreciated that the changes described herein are only related to the receiver side, while sender side can remain unchanged. It should be further appreciated that using finer data granularity for collective reduction operations can be fully hidden inside lower levels, such as MPI fabrics (e.g. OpenFabrics Interfaces (OFI)), and therefore does not require any code modification and pushing extensions to MPI standard. In this case, the output buffer is passed through the MPI interface of collective reduction and computation may be of any custom user-defined reduction operation, which is presently supported by the MPI standard. The size of the data chunk can therefore be defined by lower network layers and optimized for communication. Depending on the embodiment and/or the conditions, the size of the data chunk can be varied during a given receive operation. However, as described previously, a hint on the size optimized for computations (e.g., simd length as the smallest chunk size, cache size as the largest chunk size, etc.) may be provided and taken into account in some embodiments.

Figure 4:
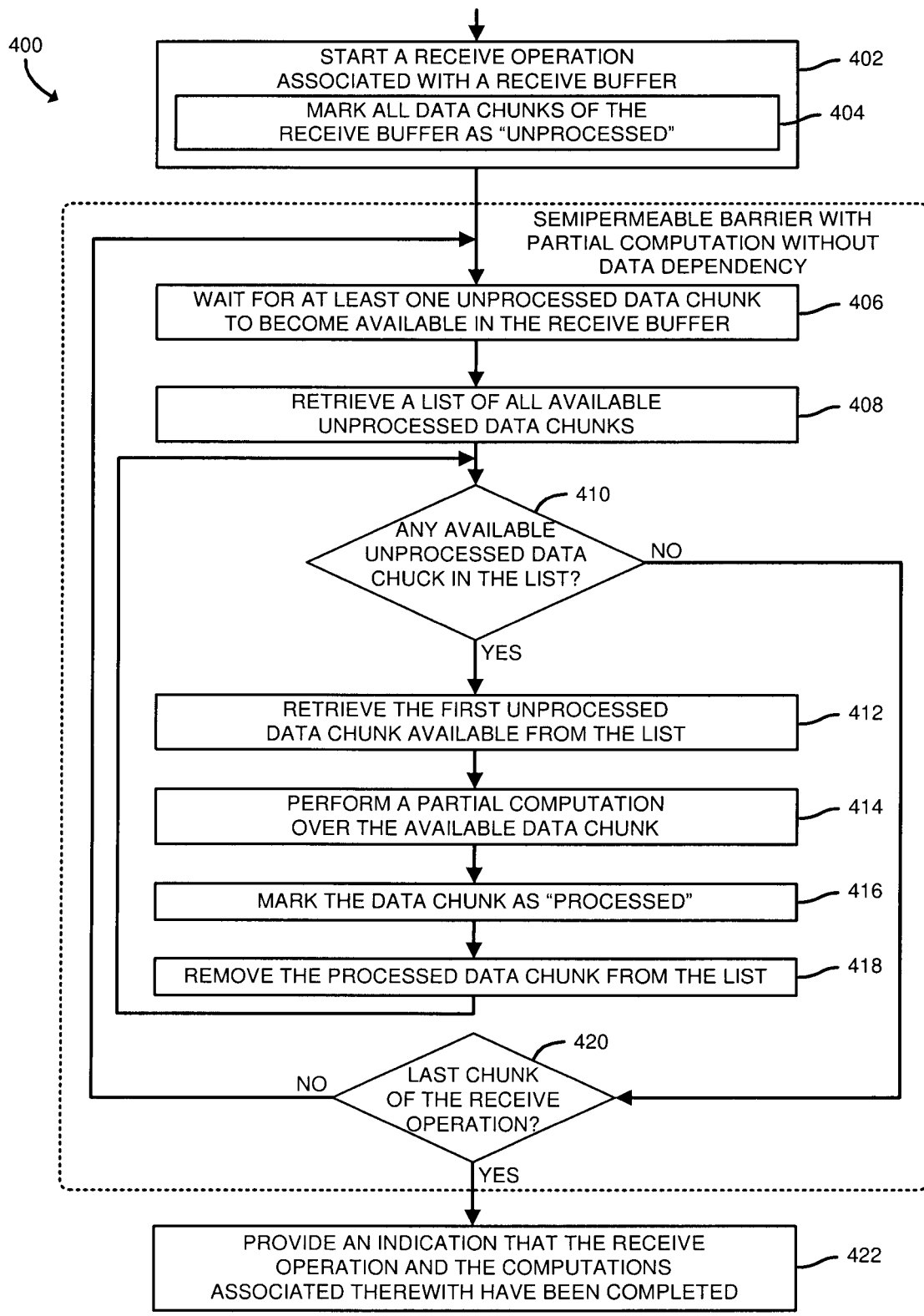
FIG. 4 is a simplified flow diagram of at least one embodiment of a method for managing data wait barrier operations having a semipermeable barrier with partial computation without data dependency that may be performed by the compute node of FIGS. 1 and 2.

Referring now to FIG. 4, the compute node 102, in operation, may execute a method 400 for managing data wait barrier operations, such as MPI wait operations. The method 400 begins in block 402, in which the compute node 102 determines that a receive operation associated with a receive buffer has been initiated (e.g., by the NIC 212). To do so, in block 404, the compute node 102 marks all of the data chunks in the receive buffer as "unprocessed". As illustratively shown, blocks 406-420 collectively comprise the semipermeable barrier with partial computation as described herein. It should be appreciated that the method 400 contemplates the first of three possible conditions: the semipermeable data wait barrier for computations without dependencies. Under such conditions, iterations of the semipermeable barrier with partial computation loop as shown in FIG. 4 can be performed independently from each other.

In block 406, the compute node 102 waits for at least one unprocessed data chunk to become available in the receive buffer. In block 408, the compute node 102 retrieves a list of all available unprocessed data chunks. It should be appreciated that several data chunks may become available simultaneously and can be taken to processing together. In block 410, the compute node 102 determines whether any available unprocessed chuck of data (e.g., associated with a network packet flow of data to be processed) is in the list. If not, the method 400 jumps to block 420, which is described below; otherwise, the method 400 proceeds to block 412. In block 412, the compute node 102 retrieves the first unprocessed data chunk available from the list of all available unprocessed data chunks.

It should be appreciated that, if there are several new data chunks available, there may be several ordering strategies, such as first-in-first-processed, last-in-first-processed, having the nearest starting position to the data chunk that has most recently been processed, or any other strategy. Accordingly, in some strategies, a processing condition may be used as an additional determination made in block 410 (e.g., has an initiated condition has been satisfied), such as for determining the closest chunk for processing. In block 414, the compute node 102, or more particularly a processor 202 of the compute node 102, performs a partial computation over the available data chunk. In block 416, the compute node 102 marks the data chunk as "processed", and in block 418, the compute node 102 removes the processed data chunk from the list.

Upon completion of the partial computation, the method 400 returns to block 410 to determine whether another unprocessed data chunk is available. As described previously, if another unprocessed data chunk is not available, the method 400 jumps to block 420, in which the compute node 102 determines whether the most recently processed data chunk is the last data chunk of the receive operation. If not, the method 400 returns to block 406 in which the compute node 102 waits for at least one unprocessed data chunk to become available in the receive buffer. Otherwise, if the most recently processed data chunk is the last data chunk of the receive operation, the method 400 proceeds to block 422. In block 422, the compute node 102 provides an indication that the receive operation and the computations associated therewith have been completed.

As described previously, collectives with reduction operations (e.g., MPI_Reduce, MPI_Allreduce, etc.), are examples of cases with no dependencies, because a reduction operation is performed on each element of the received buffer independently from other elements of the received buffer. As such, it should be appreciated that such collectives can be implemented through data wait barriers for those computations without dependencies. It should be appreciated that computations without dependencies from the received data typically do not require prologue stage and typically do not require any processing condition and condition update. In other words, any received data chunk may be processed immediately.

It should be appreciated that a ready-to-process indicator is an attribute of each received data chunk, which is determined based on a processing condition. Each processing condition may include different characteristics which should be met before the data chunk can be taken for processing. For example, one such characteristic may be data dependency. As soon as a new data chunk is received, the compute node 102 determines which conditions should be met to start processing of that particular data chunk, including which dependencies should be resolved. Among computations with data dependencies two major types can be distinguished: computations with dependencies over received data and computations with dependencies over processed data. For the first type of dependencies, processing of the received chunk of data depends only on the data available in the receive buffer, i.e. depends on other chunks of data only. In such case, the processing of the received data chunk can be started as soon as all chunks of data, on which it depends, are received. After any new data chunk has been received, the compute node 102 is configured to update the condition for all received unprocessed data chunks, since the newly received data chunk may resolve dependencies for one or more already-received data chunks waiting to be processed. For the second type of dependencies, the processing of the received chunk of data depends on the result of processing of other chunks. In such case, the processing of the received data chunk can be started as soon as all chunks of data, on which it depends, are received and processed. After any new data chunk has been received and processed, the compute node 102 is configured to update the condition for all received unprocessed data chunks, since the newly received and processed data chunk may resolve dependencies for one or more already-received data chunks waiting to be processed. The first type of dependencies is more reluctant and assumes more freedom in the order of processing chunks of data. The second type of dependencies assumes more strict order of processing data chunks up to fully preserving original order of processing data chunks.

As one example of the above, a depth of dependency may exist in which computation on an iteration of the partial computation loop depends on previous data chunks having been received. Accordingly, it should be appreciated that some processing order restriction conditions may be imposed to process handling of received message chunks and should be handled differently to preserve the order of the received chunks of data. Under such conditions, a current starting position of the message is maintained and the data chunk that has the starting position relative to the received data chunks is selected for processing. In other words, the first partial computation cannot be performed until the data chunk which satisfies the starting position condition has been received.

Figure 5:
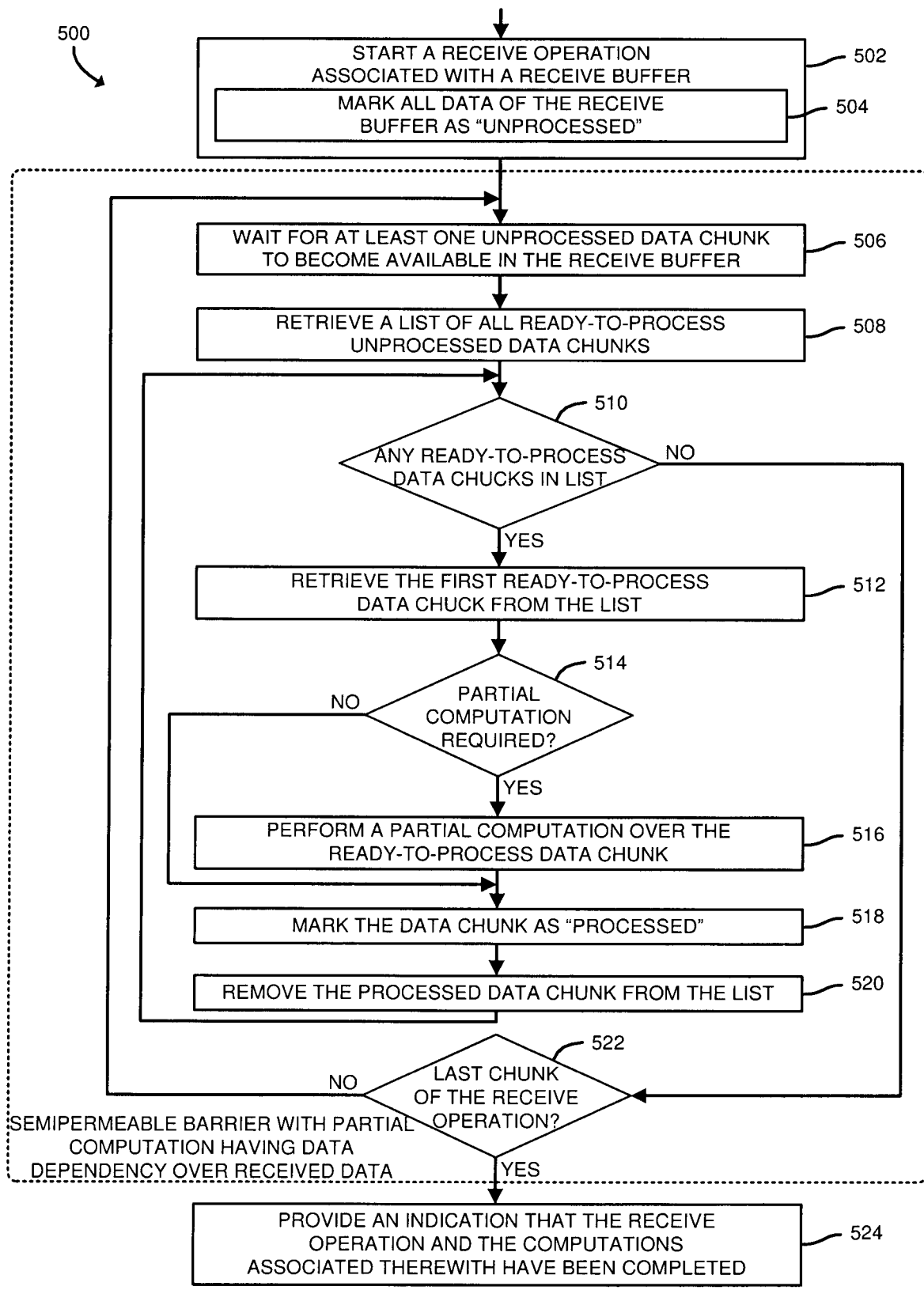
FIG. 5 is a simplified flow diagram of at least one embodiment of a method for managing data wait barrier operations having a semipermeable barrier with partial computation having data dependency over received data that may be performed by the compute node of FIGS. 1 and 2.

Referring now to FIG. 5, the compute node 102, in operation, may execute a method 500 for managing data wait barrier operations, such as MPI wait operations, with data dependencies. It should be appreciated that the method 500 contemplates the second of three conditions: the semipermeable data wait barrier for computations with dependencies over received data. The method 500 begins in block 502, in which the compute node 102 determines that a receive operation associated with a receive buffer has been initiated (e.g., by the NIC 212). To do so, in block 504, the compute node 102 marks all of the data chunks in the receive buffer as "unprocessed". As illustratively shown, blocks 506-522 collectively comprise the semipermeable barrier with partial computation having data dependency over received data as described herein.

In block 506, the compute node 102 waits for at least one unprocessed data chunk to become available in the receive buffer. In block 508, the compute node 102 retrieves a list of all ready-to-process unprocessed data chunks. It should be appreciated that several data chunks may become ready simultaneously and can be taken to processing together. In block 510, the compute node 102 determines whether a ready-to-process unprocessed chunk of data (e.g., associated with a network packet flow of data to be processed) is in the list. If not, the method 500 jumps to block 522, which is described below; otherwise, the method 500 proceeds to block 512. In block 512, the compute node 102 retrieves the first ready-to-process unprocessed data chunk from the list of all ready-to-process unprocessed data chunks.

It should be appreciated that, if there are several new data chunks that are ready to be processed, there may be several ordering strategies, such as first-in-first-processed, last-in-first-processed, having the nearest starting position to the data chunk that has most recently been processed, or any other strategy. Accordingly, in some strategies, a processing condition may be used as an additional determination made in block 510 (e.g., has an initiated condition has been satisfied), such as for determining the closest chunk for processing. In block 514, the compute node 102 determines whether a partial computation is required. If so, the method 500 proceeds to block 516, in which the compute node 102, or more particularly a processor 202 of the compute node 102, performs a partial computation over the ready-to-process data chunk. Otherwise, the method 500 skips block 516 and proceeds directly to block 518. In block 518, the compute node 102 marks the data chunk as "processed", and in block 520, the compute node 102 removes the processed data chunk from the list.

Upon completion of the partial computation, the method 500 returns to block 510 to determine whether another unprocessed data chunk is available in the list. As described previously, if another unprocessed data chunk is not available, the method 500 jumps to block 522, in which the compute node 102 determines whether the most recently processed data chunk is the last data chunk of the receive operation. If not, the method 500 returns to block 506 in which the compute node 102 again waits for at least one unprocessed data chuck to become available in the receive buffer. Otherwise, if the most recently processed data chunk is the last data chunk of the receive operation, the method 500 proceeds to block 524. In block 524, the compute node 102 provides an indication that the receive operation and the computations associated therewith have been completed.

Figure 6:
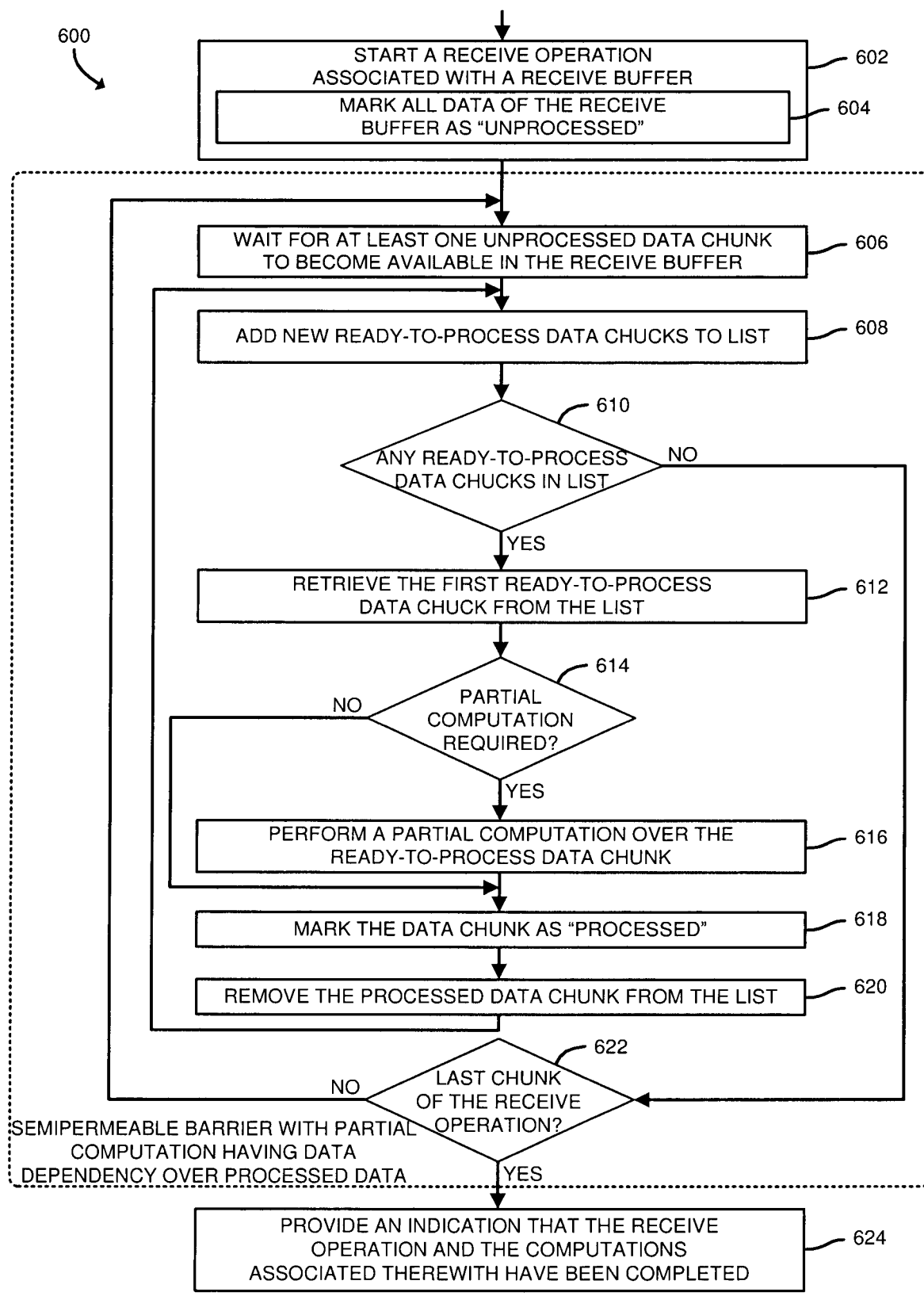
FIG. 6 is a simplified flow diagram of at least one embodiment of a method for managing data wait barrier operations having a semipermeable barrier with partial computation having data dependency over processed data that may be performed by the compute node of FIGS. 1 and 2.

Referring now to FIG. 6, the compute node 102, in operation, may execute a method 600 for managing data wait barrier operations, such as MPI wait operations, with data dependencies. It should be appreciated that the method 600 contemplates the third of three conditions: the semipermeable data wait barrier for computations with dependencies over processed data. The method 600 begins in block 602, in which the compute node 102 determines that a receive operation associated with a receive buffer has been initiated (e.g., by the NIC 212). To do so, in block 604, the compute node 102 marks all of the data chunks in the receive buffer as "unprocessed". As illustratively shown, blocks 606-622 collectively comprise the semipermeable barrier with partial computation having data dependency over processed data as described herein.

In block 606, the compute node 102 waits for at least one unprocessed data chunk to become available in the receive buffer. In block 608, the compute node 102 adds any new ready-to-process data chucks to the list. The compute node 102 may determine that a data chuck is ready to process and, as such, can be added to the list in response to a determination that all required dependent processing of other data chucks has been completed. It should be appreciated that several data chunks may become ready simultaneously and added to the list together. In block 610, the compute node 102 determines whether a ready-to-process unprocessed chunk of data (e.g., associated with a network packet flow of data to be processed) is in the list. If not, the method 600 jumps to block 622, which is described below; otherwise, the method 600 proceeds to block 612. In block 612, the compute node 102 retrieves the first ready-to-process unprocessed data chunk from the list of all ready-to-process unprocessed data chunks.

It should be appreciated that, if there are several new data chunks that are ready to be processed, there may be several ordering strategies, such as first-in-first-processed, last-in-first-processed, having the nearest starting position to the data chunk that has most recently been processed, or any other strategy. Accordingly, in some strategies, a processing condition may be used as an additional determination made in block 610 (e.g., has an initiated condition has been satisfied), such as for determining the closest chunk for processing. In block 614, the compute node 102 determines whether a partial computation is required. If so, the method 600 proceeds to block 616, in which the compute node 102, or more particularly a processor 202 of the compute node 102, performs a partial computation over the ready-to-process data chunk. Otherwise, the method 600 skips block 616 and proceeds directly to block 618. In block 618, the compute node 102 marks the data chunk as "processed", and in block 620, the compute node 102 removes the processed data chunk from the list.

Upon completion of the partial computation, the method 600 returns to block 608 in which the compute node 102 adds any new ready-to-process data chucks to the list as described above. As described previously, if another unprocessed data chunk is not available, the method 600 jumps to block 622, in which the compute node 102 determines whether the most recently processed data chunk is the last data chunk of the receive operation. If not, the method 600 returns to block 606 in which the compute node 102 again waits for at least one unprocessed data chuck to become available in the receive buffer. Otherwise, if the most recently processed data chunk is the last data chunk of the receive operation, the method 600 proceeds to block 624. In block 624, the compute node 102 provides an indication that the receive operation and the computations associated therewith have been completed.

Under certain conditions, a prologue may be needed to initialize a computation, such as when a computation depends from one or more other data chunks having been received and/or processed. The prologue portion of the receive buffer may provide an offset which is usable to identify a processing condition. In an illustrative embodiment in which prologue portion identifies the processing condition, a number of data chunks may be received, but a partial computation may not be performed thereon until the data chunk with the starting position relative to the processing condition has been received, even if other data chunks have already arrived (i.e., because the processing condition has not been satisfied).

Additionally, an epilogue may be needed if some of received elements are not expected to participate in the computation immediately after the barrier, but are going to participate in some more distant computation. For example, there may be data chunks which do not require partial computations, but may be required to initialize other computations. It should be appreciated that the compute node 102 is not configured to perform computations over received prologue and epilogue portions of the receive buffer, only receive portions of information which are relevant for subsequent computations. For example, the epilogue portion may indicate a need to receive data chunks which are not participating in the given computation, such as those received data chunks which may be targeted for any further computations.

Figure 7:
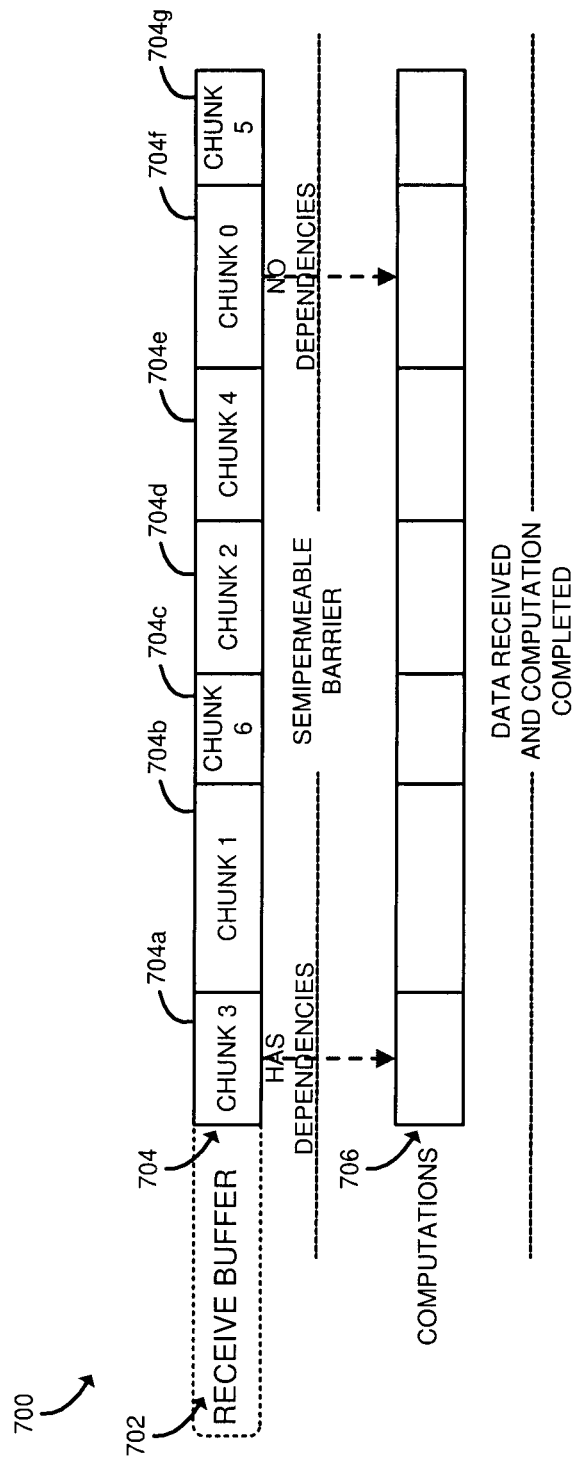
FIG. 7 is a simplified block diagram of at least one embodiment of chunks of data in a receive buffer for processing that may be established by the compute node of FIGS. 1-3.

Referring now to FIG. 7, an illustrative receive buffer 702 is shown that includes multiple received data chunks 704. As described previously, network packets with data (i.e., the received data chunks 704) may arrive, via the network 104, at the compute node 102 in an arbitrary order. As illustratively shown, the received data chunks 704 may be of different sizes and arrive at the receive buffer 702 in an arbitrary order. While not illustratively shown, it should be appreciated that the receive buffer 702, as described relative to the method 400 of FIG. 4, may include an epilogue portion and a prologue portion, each of which include information which is relevant for subsequent computations that are to be performed by the compute node 102.

The illustrative received data chunks 704 include a first received data chunk 704 designated as data chunk 704*a* and representing the fourth data chunk in a sequence of seven zeroth indexed received data chunks 704, a second received data chunk 704 designated as data chunk 704*b* and representing the second data chunk in the sequence of the received data chunks 704, a third received data chunk 704 designated as data chunk 704*c* and representing the seventh data chunk in the sequence of the received data chunks 704, a fourth received data chunk 704 designated as data chunk 704*d* and representing the third data chunk in the sequence of the received data chunks 704, a fifth received data chunk 704 designated as data chunk 704*e* and representing the fifth data chunk in the sequence of the received data chunks 704, a sixth received data chunk 704 designated as data chunk 704*f* and representing the first data chunk in the sequence of the received data chunks 704, and a seventh received data chunk 704 designated as data chunk 704*g* and representing the sixth data chunk in the sequence of the received data chunks 704.

In other words, the seven received data chunks 702 arrived to different locations in the receive buffer 702 in the order 0, 1, 2, 3, 4, 5, 6. If computation on a given loop iteration has no dependencies from other loop iterations, then partial computations can be performed in the same order as the received data chunks 704 arrive, (i.e., computation is fully communication-driven and communication order is determinant). If the computation has dependencies from previous iterations, then the computation order should be preserved and the received data chunks 704 should be processed in the order 3, 1, 6, 2, 4, 0, 5 (i.e., computation order is determinant) upon having received a prologue portion. In such cases, the available data chunks 704 can be optionally merged into larger continuous chunks of data while waiting for the next appropriate data chunk. In other words, for example, data chunks 2, 4, 0, and 5 can be merged while waiting for data chunk 6.

Referring now to FIGS. 8A-8C, illustrative receive buffers 800, 810, and 830 shown, each illustrating multiple received data chunks. The receive buffer 800 of FIG. 8A illustratively shows a prologue and an epilogue. As illustratively shown, N1<N, and as such, not all of the received elements are processed in a first computation, but will be processed in a second computation. Accordingly, partial computations in the semipermeable data wait barrier are performed only for chunk 0, chunk 1, chunk 2 of the receive buffer 800. The receive buffer 810 of FIG. 8B illustratively shows only a prologue and each chunk of data has start and end positions. In an illustrative example in which i0 elements have been received in the prologue, it should be appreciated that the next data chunk required before processing can resume should start with position i0.

In other words, all received data chunks are being checked for their respective starting position. Accordingly, if a data chunk is received whose starting position is equal to i0, then partial computation may be performed over that data chunk (e.g., chunk 0 of FIG. 8B) and increment the starting position in the receive buffer by the size of data chunk 0 (e.g., to i1), thereby updating the condition. Similarly, partial computation can be performed if and when a received data chunk starting from i1 has been received. The receive buffer 820 of FIG. 8C illustratively shows a prologue above j0 elements of the receive buffer 820. Under such conditions, the compute node 102 is configured to check the ending position of all received data chunks and take the data chunk whose ending position is equal to (N−j0), perform partial computation over this data chunk, and decrement the ending position by the size of the processed data chunk. In furtherance of the illustrative embodiment, the compute node 102 would now be waiting for a data chunk with ending position (N−j1) before performing additional partial computation.

One present technique is referred to herein as the "early release" concept, in which an MPI process has one application thread, as well as one message thread, to handle sending to and receiving from all communication channels. The application thread making the call to MPI_Recv or MPI_Wait never blocks when calling these routines. However, if the message has not arrived or is only partially complete, the application thread protects the unfinished pages of the message receive buffer and immediately returns from the MPI_Recv or MPI_Wait call. As such, computation can continue until the application thread touches a protected page, which causes an access exception, and the application is then blocked until the data for that page is available. Additionally, the messaging thread creates an alias page block for each message receive buffer posted via an MPI_Recv or MPI_Irecv call and stores incoming message data via these alias pages. When all the data for a given protected page is received it is unlocked.

In other words, blocking is implemented through the mechanism of page protection and is delayed until the application is actually trying to access blocked memory page. In this case, computations may proceed with partially received data reducing latency of receiving the whole message. It should be appreciated that if the computation in each iteration is independent from computations on other iterations (i.e., the order of computations can be safely changed), there is a potential for better overlapping communications with computations by reordering computations, which is generally not possible with an "early release" of blocked receive operations. However, some network protocols preserve order of network packets, but still the computation itself may be performed in reverse order. It should be appreciated that there is a limitation of getting a benefit over the present "early release" solution.

For example, if the original order of computations over data chunks is 1, 2, 3, 4, 5, when the network protocol preserves the order of network packets in which they were sent (e.g., 1, 2, 3, 4, 5), even though they may arrive in other order (e.g., 3, 2, 5, 1, 4), the order of computations as described herein will stay the same (e.g., 1, 2, 3, 4, 5), because it would not have a benefit to dynamically change the order of computations. With network protocols providing network packets without overhead for preserving original order, dynamically changing the order of computations as described herein to 3, 2, 5, 1, 4 can potentially provide a realized benefit. However, while there may still be an advantage over "early release" due to a finer granularity—"early release" only operates with memory page size as the smallest size, irrespective of the network packet size, while the techniques described herein operate with the size of the network packet.

In other words, there may be a situation, when even with network protocol keeping original order of network packets, there may still be a benefit over "early release" due to dynamically changed order of computations. It should be understood that realization of such a benefit depends on computation. For example, if the original order of computations is (e.g., 5, 4, 3, 2, 1), network protocol keeps order of received chunks (e.g., 1, 2, 3, 4, 5), in which case early release concept computations cannot start until data chunk 5 is received and thus will have to wait for all 5 data chunks. However, as described herein the order of computations may be dynamically changed to (e.g., 1, 2, 3, 4, 5) and computation can start immediately upon having received the first data chunk.

Under certain conditions, multiple receive buffers on the same page block application execution until all the buffers are received. In an illustrative example in which three receive operations for separate arrays are on the same memory page, early release can serve as a non-blocking function. However, although early release may proceed past the first barrier, application execution will be stalled on the first computation until all of the arrays are received. Without "early release", receiving only the first array would be enough to perform the first computation. In such case memory protection can actually introduce additional blocking.

EXAMPLES

Illustrative examples of the technologies disclosed herein are provided below. An embodiment of the technologies may include any one or more, and any combination of, the examples described below.

Example 1 includes a compute node for managing data wait barrier operations, the compute node comprising a network interface controller; and circuitry to start a receive operation associated with a receive buffer of the compute node that includes a plurality of chunks of data received from a sender compute node, wherein each of the plurality of chunks of data are received in an out-of-order sequence relative to an order in which they were transmitted from the sender compute node; determine whether a chunk of data in the receive buffer satisfies a condition to be met prior to performing one or more data wait barrier operations to be performed by the compute node to process the chunk of data; and perform, subsequent to a determination that the chunk of data in the receive buffer satisfies the condition, a partial computation over the chunk of data.

Example 2 includes the subject matter of Example 1, and wherein the circuitry is further to determine whether a next chunk of data in the receive buffer satisfies another condition to be met prior to performing another one or more data wait barrier operations to be performed by the compute node to process the next chunk of data, wherein the next chunk of data comprises a last chunk of data associated with the receive operation; perform, subsequent to a determination that the next chunk of data in the receive buffer satisfies the other condition, another partial computation over the next chunk of data; and provide an indication that the data wait barrier operations of the receive operation have completed.

Example 3 includes the subject matter of any of Examples 1 and 2, and wherein the circuitry is further to determine whether a next chunk of data in the receive buffer satisfies a next condition to be met prior to performing another one or more data wait barrier operations to be performed by the compute node to process the next chunk of data; determine, subsequent to a determination that the next chunk of data in the receive buffer does not satisfy the next condition, whether a subsequent chunk of data in the receive buffer relative to the next chunk of data in the receive buffer satisfies a subsequent condition to be met prior to performing one or more other data wait barrier operations to be performed by the compute node to process the subsequent chunk of data.

Example 4 includes the subject matter of any of Examples 1-3, and wherein the condition comprises a first semipermeable data wait barrier for the computation without a dependency, and wherein the next condition comprises a second semipermeable data wait barrier for the other computation with one or more dependencies.

Example 5 includes the subject matter of any of Examples 1-4, and wherein the one or more data wait barrier operations comprises one or more Message Passing Interface (MPI) wait operations.

Example 6, includes the subject matter of any of Examples 1-5, and wherein the one or more operations to be performed by the compute node on the plurality of chunks of data form a semipermeable barrier.

Example 7 includes the subject matter of any of Examples 1-6, and wherein to determine whether the chunk of data in the receive buffer satisfies the condition to be met prior to performing the one or more operations comprises to retrieve a prologue portion from the receive buffer.

Example 8 includes the subject matter of any of Examples 1-7, and wherein the one or more dependencies includes a dependency on at least one other chunk of data, and wherein the condition to be met comprises to stall the chunk of data from being processed until the at least one other chunk of data has been received at the receive buffer.

Example 9 includes the subject matter of any of Examples 1-8, and wherein the condition to be met comprises completion of all required dependent processing of other data chucks.

Example 10 includes a method for managing data wait barrier operations, the method comprising starting, by a compute node, a receive operation associated with a receive buffer of the compute node that includes a plurality of chunks of data received from a sender compute node, wherein each of the plurality of chunks of data are received in an out-of-order sequence relative to an order in which they were transmitted from the sender compute node; determining, by the compute node, whether a chunk of data in the receive buffer satisfies a condition to be met prior to performing one or more data wait barrier operations to be performed by the compute node to process the chunk of data; and performing, by the compute node and subsequent to a determination that the chunk of data in the receive buffer satisfies the condition, a partial computation over the chunk of data.

Example 11 includes the subject matter of Example 10, and further including determining, by the compute node, whether a next chunk of data in the receive buffer satisfies another condition to be met prior to performing another one or more data wait barrier operations to be performed by the compute node to process the next chunk of data, wherein the next chunk of data comprises a last chunk of data associated with the receive operation; performing, by the compute node and subsequent to a determination that the next chunk of data in the receive buffer satisfies the other condition, another partial computation over the next chunk of data; and providing, by the compute node, an indication that the data wait barrier operations of the receive operation have completed.

Example 12 includes the subject matter of any of Examples 10 and 11, and further including determining, by the compute node, whether a next chunk of data in the receive buffer satisfies a next condition to be met prior to performing another one or more data wait barrier operations to be performed by the compute node to process the next chunk of data; determine, by the compute node and subsequent to a determination that the next chunk of data in the receive buffer does not satisfy the next condition, whether a subsequent chunk of data in the receive buffer relative to the next chunk of data in the receive buffer satisfies a subsequent condition to be met prior to performing one or more other data wait barrier operations to be performed by the compute node to process the subsequent chunk of data.

Example 13 includes the subject matter of any of Examples 10-12, and wherein the condition comprises a first semipermeable data wait barrier for the computation without a dependency, and wherein the next condition comprises a second semipermeable data wait barrier for the other computation with one or more dependencies.

Example 14 includes the subject matter of any of Examples 10-13, and wherein the one or more data wait barrier operations comprises one or more Message Passing Interface (MPI) wait operations.

Example 15 includes the subject matter of any of Examples 10-14, and wherein the one or more operations to be performed by the compute node on the plurality of chunks of data form a semipermeable barrier.

Example 16 includes the subject matter of any of Examples 10-15, and wherein determining whether the chunk of data in the receive buffer satisfies the condition to be met prior to performing the one or more operations comprises retrieving a prologue portion from the receive buffer, and wherein (i) the one or more dependencies includes a dependency on at least one other chunk of data and (ii) the condition to be met comprises to stall the chunk of data from being processed until the at least one other chunk of data has been received at the receive buffer.

Example 17 includes the subject matter of any of Examples 10-16, and wherein the condition to be met comprises completion of all required dependent processing of other data chucks.

Example 18 includes one or more machine-readable storage media comprising a plurality of instructions stored thereon that, when executed, cause a compute node to start a receive operation associated with a receive buffer of the compute node that includes a plurality of chunks of data received from a sender compute node, wherein each of the plurality of chunks of data are received in an out-of-order sequence relative to an order in which they were transmitted from the sender compute node; determine whether a chunk of data in the receive buffer satisfies a condition to be met prior to performing one or more data wait barrier operations to be performed by the compute node to process the chunk of data; and perform, subsequent to a determination that the chunk of data in the receive buffer satisfies the condition, a partial computation over the chunk of data.

Example 19 includes the subject matter of Example 18, and wherein the plurality of instructions, when executed, further cause the compute node to determine whether a next chunk of data in the receive buffer satisfies a next condition to be met prior to performing another one or more data wait barrier operations to be performed by the compute node to process the next chunk of data; determine, subsequent to a determination that the next chunk of data in the receive buffer does not satisfy the next condition, whether a subsequent chunk of data in the receive buffer relative to the next chunk of data in the receive buffer satisfies a subsequent condition to be met prior to performing one or more other data wait barrier operations to be performed by the compute node to process the subsequent chunk of data.

Example 20 includes the subject matter of any of Examples 18 and 19, and wherein the plurality of instructions, when executed, further cause the compute node to determine whether a next chunk of data in the receive buffer satisfies a next condition to be met prior to performing another one or more data wait barrier operations to be performed by the compute node to process the next chunk of data; determine, subsequent to a determination that the next chunk of data in the receive buffer does not satisfy the next condition, whether a subsequent chunk of data in the receive buffer relative to the next chunk of data in the receive buffer satisfies a subsequent condition to be met prior to performing one or more other data wait barrier operations to be performed by the compute node to process the subsequent chunk of data.

Example 21 includes the subject matter of any of Examples 18-20, and wherein the condition comprises a first semipermeable data wait barrier for the computation without a dependency, and wherein the next condition comprises a second semipermeable data wait barrier for the other computation with one or more dependencies.

Example 22 includes the subject matter of any of Examples 18-21, and wherein the one or more data wait barrier operations comprises one or more Message Passing Interface (MPI) wait operations.

Example 23 includes the subject matter of any of Examples 18-22, and wherein the one or more operations to be performed by the compute node on the plurality of chunks of data form a semipermeable barrier.

Example 24 includes the subject matter of any of Examples 18-23, and wherein to determine whether the chunk of data in the receive buffer satisfies the condition to be met prior to performing the one or more operations comprises to retrieve a prologue portion from the receive buffer, and wherein (i) the one or more dependencies includes a dependency on at least one other chunk of data and (ii) the condition to be met comprises to stall the chunk of data from being processed until the at least one other chunk of data has been received at the receive buffer.

Example 25 includes the subject matter of any of Examples 18-24, and wherein the condition to be met comprises completion of all required dependent processing of other data chucks.

The invention claimed is:

1. A compute node comprising:
   a network interface controller; and
   circuitry, coupled to the network interface controller, the circuitry to:
   start a receive operation associated with a receive buffer of the compute node that includes a plurality of chunks of data from a sender compute node, wherein at least two of the plurality of chunks of data are received in an out-of-order sequence relative to an order in which they were transmitted from the sender compute node;
   determine whether a chunk of data in the receive buffer satisfies a condition to be met prior to performing one or more data wait barrier operations to be performed by the compute node to process the chunk of data; and
   perform, subsequent to a determination that the chunk of data in the receive buffer satisfies the condition, a partial computation over the chunk of data, wherein the chunk of data is less than the plurality of chunks of data from the sender compute node.

2. The compute node of claim 1, wherein the circuitry is further to:
   determine whether a next chunk of data in the receive buffer satisfies another condition to be met prior to performing another one or more data wait barrier operations to be performed by the compute node to process the next chunk of data, wherein the next chunk of data comprises a last chunk of data associated with the receive operation;
   perform, subsequent to a determination that the next chunk of data in the receive buffer satisfies the another condition, another partial computation over the next chunk of data; and
   provide an indication that the data wait barrier operations of the receive operation have completed.

3. The compute node of claim 1, wherein the circuitry is further to:
   determine whether a next chunk of data in the receive buffer satisfies a next condition to be met prior to performing another one or more data wait barrier operations to be performed by the compute node to process the next chunk of data;
   determine, subsequent to a determination that the next chunk of data in the receive buffer does not satisfy the next condition, whether a subsequent chunk of data in the receive buffer relative to the next chunk of data in the receive buffer satisfies a subsequent condition to be met prior to performing one or more other data wait barrier operations to be performed by the compute node to process the subsequent chunk of data.

4. The compute node of claim 3, wherein the condition comprises a first semipermeable data wait barrier for computation without a dependency, and wherein the next condition comprises a second semipermeable data wait barrier for another computation with one or more dependencies.

5. The compute node of claim 1, wherein the one or more data wait barrier operations comprises one or more Message Passing Interface (MPI) wait operations.

6. The compute node of claim 1, wherein the one or more data wait barrier operations to be performed by the compute node on the plurality of chunks of data form a semipermeable barrier.

7. The compute node of claim 1, wherein to determine whether the chunk of data in the receive buffer satisfies the condition to be met prior to performing the one or more data wait barrier operations comprises to retrieve a prologue portion from the receive buffer.

8. The compute node of claim 7, wherein one or more dependencies includes a dependency on at least one other chunk of data, and wherein the condition to be met comprises to stall the chunk of data from being processed until at least one other chunk of data has been received at the receive buffer.

9. The compute node of claim 1, wherein the condition to be met comprises completion of all required dependent processing of other data chunks.

10. A method comprising:
    starting, by a compute node, a receive operation associated with a receive buffer of the compute node that includes a plurality of chunks of data received from a sender compute node, wherein at least two of the plurality of chunks of data are received in an out-of-order sequence relative to an order in which they were transmitted from the sender compute node;
    determining, by the compute node, whether a chunk of data in the receive buffer satisfies a condition to be met prior to performing one or more data wait barrier operations to be performed by the compute node to process the chunk of data; and
    performing, by the compute node and subsequent to a determination that the chunk of data in the receive buffer satisfies the condition, a partial computation over the chunk of data, wherein the chunk of data is less than the plurality of chunks of data received from the sender compute node.

11. The method of claim 10, further comprising:
    determining, by the compute node, whether a next chunk of data in the receive buffer satisfies another condition to be met prior to performing another one or more data wait barrier operations to be performed by the compute node to process the next chunk of data, wherein the next chunk of data comprises a last chunk of data associated with the receive operation;
    performing, by the compute node and subsequent to a determination that the next chunk of data in the receive buffer satisfies the another condition, another partial computation over the next chunk of data; and
    providing, by the compute node, an indication that the data wait barrier operations of the receive operation have completed.

12. The method of claim 10, further comprising:
    determining, by the compute node, whether a next chunk of data in the receive buffer satisfies a next condition to be met prior to performing another one or more data wait barrier operations to be performed by the compute node to process the next chunk of data;
    determine, by the compute node and subsequent to a determination that the next chunk of data in the receive buffer does not satisfy the next condition, whether a subsequent chunk of data in the receive buffer relative to the next chunk of data in the receive buffer satisfies a subsequent condition to be met prior to performing one or more other data wait barrier operations to be performed by the compute node to process the subsequent chunk of data.

13. The method of claim 12, wherein the condition comprises a first semipermeable data wait barrier for a computation without a dependency, and wherein the next condition comprises a second semipermeable data wait barrier for another computation with one or more dependencies.

14. The method of claim 10, wherein the one or more data wait barrier operations comprises one or more Message Passing Interface (MPI) wait operations.

15. The method of claim 10, wherein the one or more data wait barrier operations to be performed by the compute node on the plurality of chunks of data form a semipermeable barrier.

16. The method of claim 10, wherein determining whether the chunk of data in the receive buffer satisfies the condition to be met prior to performing the one or more data wait barrier operations comprises retrieving a prologue portion from the receive buffer, and wherein the condition to be met comprises to stall the chunk of data from being processed until at least one other chunk of data has been received at the receive buffer.

17. The method of claim 10, wherein the condition to be met comprises completion of all required dependent processing of other data chunks.

18. One or more non-transitory machine-readable storage media comprising a plurality of instructions stored thereon that, when executed, cause a compute node to:

start a receive operation associated with a receive buffer of the compute node that includes a plurality of chunks of data from a sender compute node, wherein at least two of the plurality of chunks of data are received in an out-of-order sequence relative to an order in which they were transmitted from the sender compute node;

determine whether a chunk of data in the receive buffer satisfies a condition to be met prior to performing one or more data wait barrier operations to be performed by the compute node to process the chunk of data; and perform, subsequent to a determination that the chunk of data in the receive buffer satisfies the condition, a partial computation over the chunk of data, wherein the chunk of data is less than the plurality of chunks of data from the sender compute node.

19. The one or more machine-readable storage media of claim 18, wherein the plurality of instructions, when executed, further cause the compute node to:

determine whether a next chunk of data in the receive buffer satisfies a next condition to be met prior to performing another one or more data wait barrier operations to be performed by the compute node to process the next chunk of data;

determine, subsequent to a determination that the next chunk of data in the receive buffer does not satisfy the next condition, whether a subsequent chunk of data in the receive buffer relative to the next chunk of data in the receive buffer satisfies a subsequent condition to be met prior to performing one or more other data wait barrier operations to be performed by the compute node to process the subsequent chunk of data.

20. The one or more machine-readable storage media of claim 19, wherein the condition comprises a first semipermeable data wait barrier for a computation without a dependency, and wherein the next condition comprises a second semipermeable data wait barrier for another computation with one or more dependencies.

21. The one or more machine-readable storage media of claim 18, wherein the one or more data wait barrier operations comprises one or more Message Passing Interface (MPI) wait operations.

22. The one or more machine-readable storage media of claim 18, wherein the one or more data wait barrier operations to be performed by the compute node on the chunk of data form a semipermeable barrier.

23. The one or more machine-readable storage media of claim 18, wherein to determine whether the chunk of data in the receive buffer satisfies the condition to be met prior to performing the one or more operations comprises to retrieve a prologue portion from the receive buffer, and wherein (i) one or more dependencies includes a dependency on at least one other chunk of data and (ii) the condition to be met comprises to stall the chunk of data from being processed until at least one other chunk of data has been received at the receive buffer.

24. The one or more machine-readable storage media of claim 18, wherein the condition to be met comprises completion of all required dependent processing of other data chunks.

* * * * *